(12) United States Patent
Harriet et al.

(10) Patent No.: US 9,874,149 B2
(45) Date of Patent: Jan. 23, 2018

(54) METHOD AND SYSTEM FOR STARTING AN AIRCRAFT TURBOENGINE

(71) Applicant: Turbomeca, Bordes (FR)

(72) Inventors: Pierre Harriet, Billere (FR); Jean Philippe Jacques Marin, Jurancon (FR)

(73) Assignee: TURBOMECA, Bordes (FR)

( * ) Notice: Subject to any disclaimer, the term of this patent is extended or adjusted under 35 U.S.C. 154(b) by 236 days.

(21) Appl. No.: 14/426,310

(22) PCT Filed: Aug. 27, 2013

(86) PCT No.: PCT/FR2013/051977
§ 371 (c)(1),
(2) Date: Mar. 5, 2015

(87) PCT Pub. No.: WO2014/037649
PCT Pub. Date: Mar. 13, 2014

(65) Prior Publication Data
US 2015/0211421 A1 Jul. 30, 2015

(30) Foreign Application Priority Data
Sep. 10, 2012 (FR) .................................. 12 58460

(51) Int. Cl.
*F02C 7/268* (2006.01)
*F02C 7/264* (2006.01)
(Continued)

(52) U.S. Cl.
CPC .............. *F02C 7/268* (2013.01); *F01D 19/00* (2013.01); *F02C 7/264* (2013.01); *F02C 7/275* (2013.01);
(Continued)

(58) Field of Classification Search
CPC .... F05D 2220/50; F05D 2260/85; F02C 7/32; F02C 7/26; F02C 7/262; F02C 7/264;
(Continued)

(56) References Cited

U.S. PATENT DOCUMENTS 6,035,626 A * 3/2000 Wahl ....................... F02C 7/275
290/40 A
2009/0069998 A1 3/2009 Mehrer
2011/0094241 A1 4/2011 Rodd

FOREIGN PATENT DOCUMENTS

EP 0 623 741 A1 11/1994
EP 0 942 521 A1 9/1999

OTHER PUBLICATIONS

International Search Report dated Dec. 20, 2013, issued in corresponding International Application No. PCT/FR2013/051977, filed Aug. 27, 2013, 3 pages.

\* cited by examiner

*Primary Examiner* — William H Rodriguez
*Assistant Examiner* — Marc Amar
(74) *Attorney, Agent, or Firm* — Christensen O'Connor Johnson Kindness PLLC

(57) ABSTRACT

The invention relates to a method for starting an aircraft turboshaft engine, said turboshaft engine comprising a combustion chamber, a compressor shaft on which a compressor wheel is mounted to feed compressed air to said combustion chamber, at least one starter connected to said shaft so as to provide it with a specified starting torque for driving it in rotation. The method comprises accelerating the compressor shaft during a first start-up phase, then stabilizing the rotational speed of the compressor shaft during a second start-up phase. During acceleration of the compressor shaft, (Continued)

Figure 1:
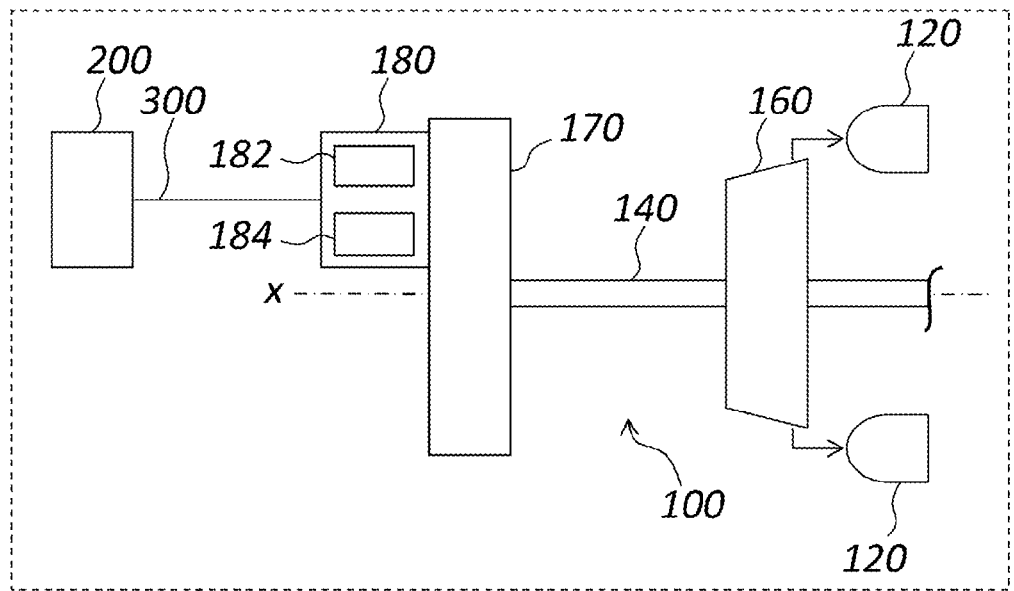

the rotational speed of the shaft is regulated such that the acceleration of the shaft remains substantially constant.

10 Claims, 2 Drawing Sheets

(51) Int. Cl.
    *F01D 19/00*     (2006.01)
    *F02C 7/275*     (2006.01)

(52) U.S. Cl.
    CPC ...... *F05D 2260/85* (2013.01); *F05D 2270/04* (2013.01); *F05D 2270/304* (2013.01); *F05D 2270/309* (2013.01)

(58) Field of Classification Search
    CPC .. F02C 7/268; F02C 7/275; F02C 7/27; F02C 7/272; F02C 7/277; B64D 2013/0696; F01D 19/00
    See application file for complete search history.

METHOD AND SYSTEM FOR STARTING AN AIRCRAFT TURBOENGINE

The present invention relates to a method and to a system for starting up an aircraft turboshaft engine.

An aircraft turboshaft engine comprises, in a known manner, a combustion chamber, a compressor shaft on which a compressor wheel is mounted to feed compressed air to said combustion chamber, and at least one starter (or a starter generator) connected to said shaft so as to provide it with a starting torque that is sufficient for driving it in rotation.

To start the turboshaft engine, the starter first accelerates the compressor shaft in a first start-up phase during which the fuel circuit upstream of the start-up injectors is pressurised and purged. Then, in a second start-up phase, fuel injection is initiated before said fuel is ignited in the combustion chamber of the turboshaft engine. Finally, in a third start-up phase, at a predetermined rotational speed, the action of the starter is stopped and the turboshaft engine can continue to accelerate due to the combustion of said fuel.

In order to allow the fuel to be ignited, a sufficient volume of air needs to be provided by the compressor wheel to the combustion chamber, but this volume cannot be too great, since it would then prevent the fuel from igniting. Since the rotational speed of the compressor shaft is proportional to the volume of air provided by the compressor wheel to the combustion chamber, the rotational speed of the shaft therefore needs to be within a speed range, referred to as an ignition window, for a sufficient length of time for ignition to be carried out correctly.

WO2011/056360 describes a method for igniting a gas turbine in which the rotational speed of the turbine is controlled so as to be kept within 5% of a predetermined speed, referred as the ignition speed, during the second start-up phase. However, a problem arises when the acceleration of the shaft, brought about by the starter in the first start-up phase, is such that it is not possible to reduce the rotational speed of the shaft in order to stabilise it within the ignition window. In other words, too great an increase in the rotational speed of the shaft may cause, as explained below, the ignition window of the turboshaft engine to be entered too rapidly, which does not allow the turboshaft engine to be ignited.

Indeed, in a turboshaft engine, it is common to use a starter of the electric type which is in the form of a synchronous machine powered by a battery via power electronics and functions as a motor during the start-up phase of the turboshaft engine and as a generator during the flight phases of the aircraft. The object of the engine torque provided by the starter is to overcome all the resistive torques resulting mainly from the aerodynamic drag from the parts which are set in rotation, from the mechanical friction of the parts which are in contact and from the different stages of the oil- and fuel pumps of the turboshaft engine.

However, the resistive torque that the starter has to overcome may vary significantly depending on the environmental conditions, in particular temperature and atmospheric pressure, to which the turboshaft engine is subjected. Certification regulations generally require it to be possible to carry out start-ups at a plurality of altitudes and in different climatic conditions.

For example, in cold weather, that is to say when the ambient temperature is low, for example −20° C., the resistive torque that the starter needs to overcome to start up the turboshaft engine increases considerably compared with the resistive torque that the starter needs to overcome at a positive ambient temperature, in particular because the resistive torques of the oil- and fuel pumps with which the turboshaft engine is equipped are higher in cold weather.

The starter therefore needs to be capable of allowing start-up in these conditions, such that its power is anticipated for this purpose. This means that high-powered starters need to be used.

In doing this, high power of this type does not make it possible to correctly control the torque provided by the starter, and this may cause too great an acceleration of the shaft, which may lead to the ignition window being entered too rapidly and therefore to the ignition of the fuel failing or being aborted.

The object of the present invention is to eliminate these drawbacks at least in part by proposing an efficient method for starting up a turboshaft engine which in particular allows a plurality of consecutive start-ups of the turboshaft engine, in particular at different altitudes.

Therefore, the invention relates to a method for starting an aircraft turboshaft engine, said turboshaft engine comprising a combustion chamber, a compressor shaft on which a compressor wheel is mounted to feed compressed air to said combustion chamber, at least one starter connected to said shaft so as to provide it with a specified starting torque for driving it in rotation, said method comprising:
  a step of accelerating the compressor shaft during a first start-up phase, then
  a step of stabilising the rotational speed of the compressor shaft during a second start-up phase so as to allow the fuel to be ignited,
the method being distinctive in that the rotational speed of the shaft is regulated such that the acceleration of the shaft remains substantially constant, in particular during the first start-up phase.

The term "regulated" means that the rotational speed of the shaft is continuously controlled, in particular during the first start-up phase, such that the acceleration of the shaft remains substantially constant whatever the environmental conditions of the turboshaft engine (low temperature, low pressure, etc.). Regulation of this type can be carried out using a speed or torque reference which may be, for example, a speed value or a torque value, or a percentage increase or decrease in speed or torque.

The term "starter" means, in this case and in the rest of the description, both a simple starter and a starter generator.

The increase in the rotational speed of the shaft with constant acceleration during the first start-up phase allows the rotational speed of the shaft to be controlled such that it reaches and can be kept within the ignition window for a sufficiently long time period to allow the turboshaft engine to be ignited, to allow the fuel circuit to be gradually pressurised upstream of the start-up injectors and to allow said circuit to be purged. Without regulation of this type, the torque provided by the starter may, for example in cold weather, be too high, and therefore it would lead to too sudden an acceleration of the shaft, such that the ignition window is entered too rapidly.

In the stabilisation step, the rotational speed of the shaft is kept within a speed range which allows the combustion chamber to be ignited, for example of between 10% and 15% of the nominal rotational speed of the shaft. "Nominal speed" means the speed of the compressor shaft when the turboshaft engine is operating in a mode allowing maximum take-off power (MTOP) to be provided.

Preferably, the rotational speed of the shaft is regulated such that the acceleration of the shaft remains substantially zero during the second start-up phase.

Ignition can be detected when the temperature of the gases output from the turboshaft engine exceeds a predetermined threshold. A control-time interval may allow it to be concluded that the combustion is stable enough for this stabilisation phase to be ended.

The method may further comprise, after ignition of the fuel, a step of accelerating the shaft during a third start-up phase, which allows the compressor wheel to be accelerated, for example up to the maximum speed for the end of the start-up sequence. This step may include continuous stabilisation of the torque provided by the starter, for example by a torque reference, to the compressor shaft over the duration of the third start-up phase. Such continuous control of the torque provided to the compressor shaft by the starter allows the starter to be prevented from providing too high a torque during this third phase, which torque would risk leading to the combustion chamber being extinguished if the temperature of the combustion chamber becomes too low. Indeed, when the torque is too high, the resulting acceleration of the shaft may increase the flow rate of air provided by the compressor compared with the fuel flow rate, such that the fuel/air ratio becomes too low and the engine stops. This allows, in particular, optimum operation of the turboshaft engine during the acceleration phase of the shaft, after ignition of the fuel. Of course, the continuous stabilisation of the torque provided by the starter may also be produced by a speed reference. When the torque reference is sent by an engine computer of the aircraft, the use of a torque reference may advantageously make it possible for there to be no interference with a speed loop which is used by the computer for metering the flow of fuel. During the third phase, the acceleration depends on the evolution of the resistive torque of the turboshaft engine, which may vary depending in particular on the rotational speed of the shaft and on the thermal behaviour of the turboshaft engine.

Preferably, the rotational speed of the shaft is regulated such that the acceleration of the shaft remains substantially constant during the third start-up phase.

Preferably, the speed is regulated periodically, in particular over the entire duration of the first phase. For example, the period may be less than or equal to one second, preferably less than or equal to 100 ms. Such periodic regulation allows very precise control of the acceleration of the shaft, such that it remains substantially constant, in particular over the entire duration of the first start-up phase.

Preferably, the regulation step comprises:
a step of obtaining an acceleration value over a time interval,
a step of calculating the difference between the obtained acceleration value and a reference acceleration value,
a step of comparing the calculated difference with a predetermined threshold,
a step of determining a speed or torque reference from the calculated difference if said threshold is exceeded.

In an alternative embodiment of the method according to the invention, the regulation step comprises:
a step of obtaining a first acceleration value over a first time interval,
a step of obtaining a second acceleration value over a second time interval, preferably consecutively with the first time interval,
a step of calculating the difference between the first obtained acceleration value and the the second obtained acceleration value,
a step of comparing the calculated difference with a predetermined threshold,
a step of determining a speed or torque reference from the calculated difference if said threshold is exceeded.

Preferably, the step of obtaining an acceleration value is carried out from two consecutive measurements of the rotational speed of the shaft.

Therefore, for example, the rotational speed of the shaft may be measured periodically and then, for each time interval between two speed measurements, the acceleration of the shaft over this time interval is calculated.

The calculated acceleration value may thus be compared with a constant and predetermined reference value, or with another previously calculated acceleration value.

A speed reference is thus determined from the comparison made, so as to allow the rotational speed of the shaft to be adapted. The speed reference indicates, for example, the speed that the shaft needs to reach so that the acceleration is brought back to the reference value or to a value obtained in a previous time interval.

To start up the turboshaft engine rapidly, the acceleration needs to be at least equal to 2.5% of the nominal speed per second, so that the duration of the first phase is less than 4 seconds.

In the same way, the acceleration value needs to be less than a maximum value, approximately 5% of the nominal speed per second, so that it is possible to stabilise the rotational speed of the shaft within the ignition window without exceeding the maximum value of the window, beyond which the volume of air in the combustion chamber would be too great and would prevent the fuel from igniting.

The reference acceleration value can be determined from environmental conditions of the turboshaft engine. Therefore, for example, the reference value can be determined, at the point of start-up, from temperature and ambient atmospheric pressure values which directly influence the resistive torques that the starter needs to overcome. These conditions can vary rapidly, in particular when the pilot has to carry out a restart during flight at altitude if the turboshaft engine has stopped.

Therefore, using the method according to the invention, the rotational speed of the shaft for keeping the acceleration constant during the first start-up phase can be continuously regulated by taking into account the variation of the environmental conditions of the turboshaft engine, such that the torque provided to the shaft by the starter is adapted to the resistive torques, corresponding to these conditions, which the starter needs to overcome in order to allow precise control of the acceleration of the shaft and therefore successful ignition of the fuel during the stabilisation phase.

The method may also comprise a preliminary step of setting the shaft in rotation by means of the starter.

The invention also relates to a system for starting up an aircraft turboshaft engine, said system comprising a turboshaft engine and means for managing said turboshaft engine, the turboshaft engine comprising a combustion chamber, a compressor shaft on which a compressor wheel is mounted to feed compressed air to said combustion chamber, at least one starter connected to said shaft so as to provide it with a specified starting torque for driving it in rotation, said starter comprising means for accelerating the compressor shaft during a first start-up phase, and means for stabilising the rotational speed of the compressor shaft during a second start-up phase, so as to allow fuel to be injected into the combustion chamber and to allow the fuel to be ignited, the management means being configured to regulate the rotational speed of the shaft such that the acceleration of the shaft remains substantially constant, in particular during the first start-up phase.

Preferably, the management means are further configured to regulate the rotational speed of the shaft such that the acceleration of the shaft remains substantially constant during the second start-up phase.

Still preferably, the management means are further configured to regulate the rotational speed of the shaft such that the acceleration of the shaft is at a maximum during the third start-up phase.

According to a feature of the invention, the starter is electric and comprises an electronic circuit allowing the torque provided to the shaft to be controlled.

The invention also relates to an aircraft comprising a turboshaft engine and a system as specified above.

Figure 2:
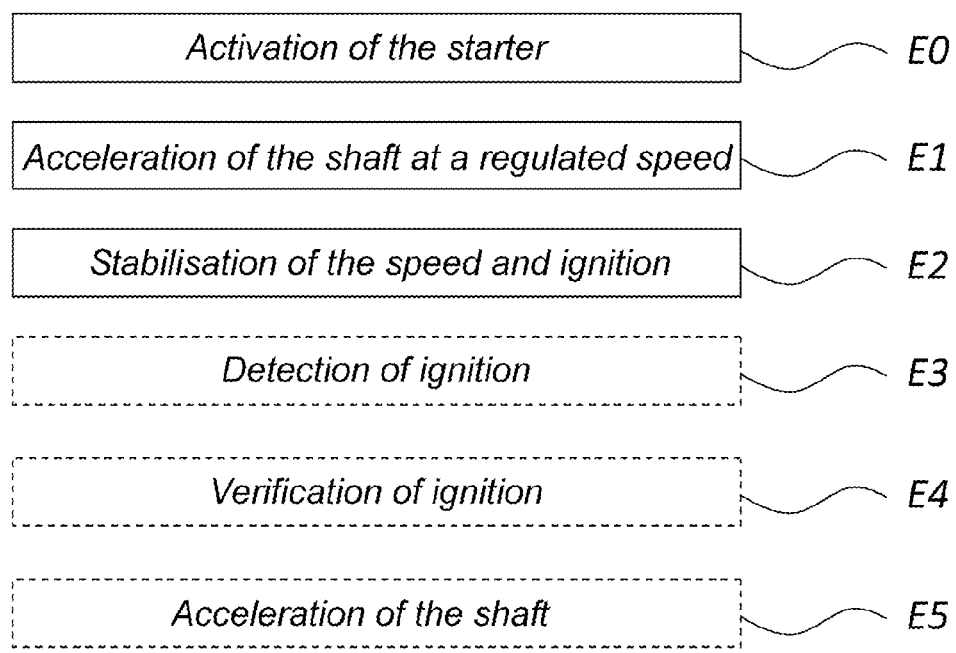
Figure 3:
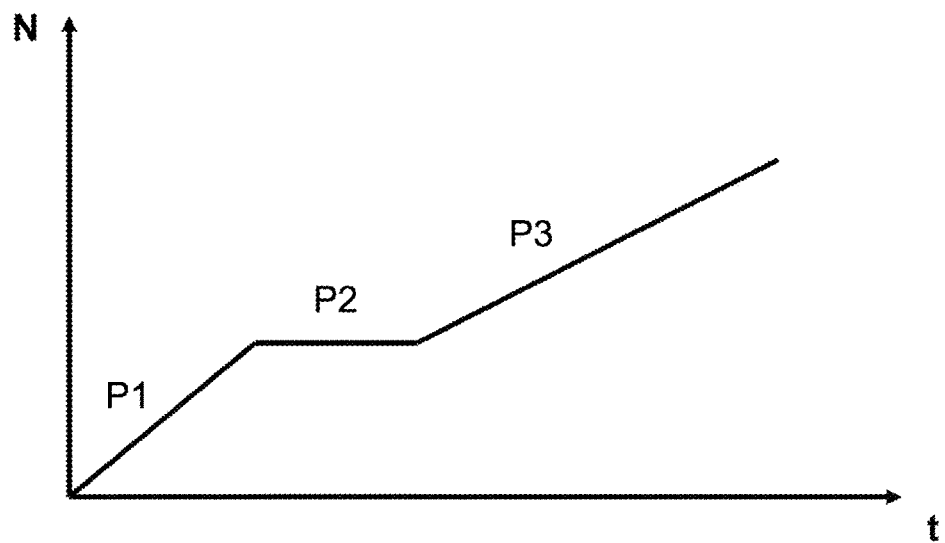
Figure 4:
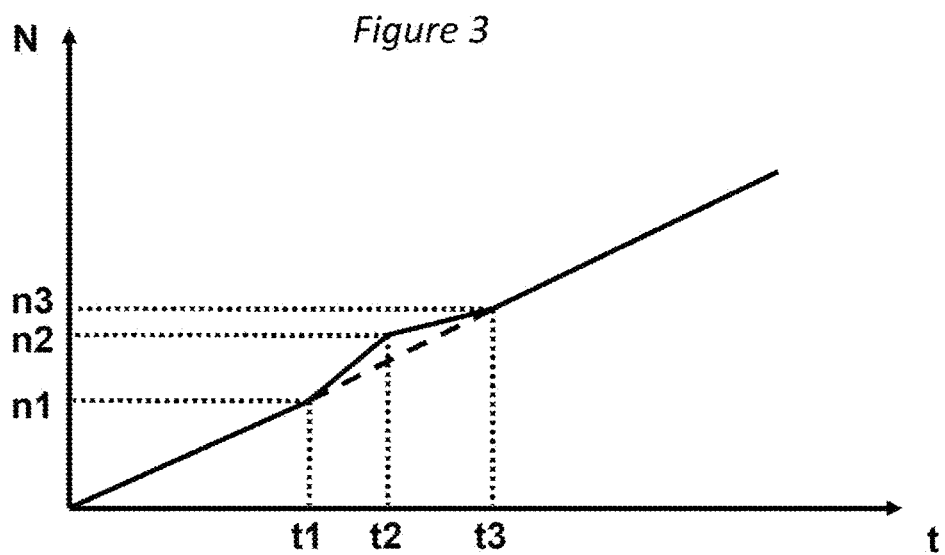

Other features and advantages of the invention will become apparent upon reading the following description, with reference to the accompanying drawings given by way of non-limiting example and in which identical reference signs are given to similar elements. In the drawings:

FIG. 1 schematically shows the system according to the invention,

FIG. 2 shows the method according to the invention which is implemented by the system, FIG. 3 is a graph showing the three start-up phases of a turboshaft engine of an aircraft equipped with the system according to the invention, FIG. 4 is a graph of the rotational speed of the compressor shaft of the system according to the invention.

DESCRIPTION OF THE SYSTEM ACCORDING TO THE INVENTION

The system 10 for starting up an aircraft turboshaft engine according to the invention, shown in FIG. 1, comprises a turboshaft engine 100 and means 200 for managing said turboshaft engine 100.

The turboshaft engine 100 comprises a combustion chamber 120, a compressor shaft 140 on which a compressor wheel 160 is mounted to feed compressed air to said combustion chamber 120 and an electric starter 180 connected to said shaft 140 by a transmission relay box 170, so as to provide the shaft 140 with a specified starting torque for driving it in rotation.

The compressor shaft 140 is arranged coaxially with the compressor wheel 160 and the combustion chamber 120 along an axis X.

The transmission relay box 170, which may for example be in the form of several pinion stages, allows transmission of the torque provided by the starter to the compressor shaft 140. It is well understood that the starter 180 could be mounted directly on the compressor shaft 140 without this limiting the scope of the present invention.

The starter 180 also comprises means 182 for accelerating the compressor shaft 140 in order to accelerate the rotational speed of the compressor shaft 140 during a first start-up phase P1 and during a third start-up phase P3, with reference to FIG. 3.

The starter 180 also comprises means 184 for stabilising the rotational speed of the compressor shaft 140 during a second start-up phase P2, with reference to FIG. 3, so as to allow fuel to be injected into the combustion chamber 120 and to allow said fuel to be ignited.

The acceleration means 182 and/or the stabilisation means 184 are controlled by an electronic circuit (not shown) so as to manage the level of torque provided to the shaft 140 by the starter 180. Such an electronic circuit is configured to receive speed references and/or torque references such that the starter 180 provides the shaft 140 with a torque allowing said speed to be reached or to be equal to said torque.

The means 200 for managing the turboshaft engine 100 may be in the form of a computer, for example of the FADEC-type (full authority digital engine control) engine computer type, connected to the electronic circuit for controlling the starter 180 by one or more communication links 300, for example one or more digital buses, allowing references, for example speed references and/or torque references, to be sent via the management means 200 to the electronic circuit for controlling the starter 180.

The means 200 for managing the turboshaft engine 100 allow, by sending references to the starter 180, the rotational speed of the shaft 140 to be regulated such that its acceleration remains substantially constant during the first start-up phase P1, whatever the environmental conditions of the turboshaft engine 100, such as temperature and pressure conditions.

Implementation of the Method According to the Invention

The method according to the invention is shown in FIG. 2 and described with reference to FIG. 3.

When a turboshaft engine needs to be started up, on the ground or in flight, an activation command is sent to the electric starter 180, in a step E0, so that it provides torque to the shaft 140 via the transmission relay 170.

The compressor shaft 140 is then accelerated, during a step E1, by the starter 180 during a first start-up phase P1.

During this first start-up phase P1, the rotational speed of the shaft 140 is regulated so that the acceleration of the shaft 140 remains substantially constant during the first phase P1.

More specifically, once the compressor shaft 140 is set in rotation by the starter 180, the speed N of the shaft 140 is measured periodically, for example every 100 ms, by a sensor (not shown).

This measurement is periodically communicated to the management means 200, for example via the communication link 300. The management means 200 thus calculate an acceleration value over a time interval [t1, t2] from two consecutive speed measurements n1 and n2, measured at times t1 and t2 respectively, shown in FIG. 4, according to the formula:

$$A[t1, t2] = \frac{n2 - n1}{t2 - t1}$$

The acceleration $A_{MES}$ measured over the time interval [t1, t2] is thus compared with a reference acceleration $A_{REF}$ corresponding to a constant predetermined acceleration value, for example from environmental conditions of the turboshaft engine 100 determined by past experience, for which there are correspondence tables which associate determined ambient conditions with a reference acceleration $A_{REF}$. Of course, the reference value $A_{REF}$ may be different for each start-up phase.

As regards the first start-up phase, the reference acceleration $A_{REF}$ may be determined such that it lasts for a duration that is long enough for it not to have to accelerate too suddenly and exceed the start-up window, but that is short enough to start up the turboshaft engine rapidly, for example between three and four seconds. Therefore, preferably, the reference acceleration $A_{REF}$ is at least equal to 2.5% of the nominal speed per second, such that the duration of the first phase is less than 4 seconds, and is less than 25% of the nominal speed per second, such that it is possible to stabilise the rotational speed of the shaft within the ignition window.

With reference to FIG. 4, the shaft has an acceleration which corresponds to the reference acceleration $A_{REF}$ previously at time t1 and subsequently at time t3. Using the method according to the invention, when the difference between the measured acceleration $A_{MES}$ over the time interval [t1, t2] and the reference value $A_{REF}$ is greater than a predetermined threshold, for example 5% of the reference value $A_{REF}$, that is to say when the acceleration is not substantially constant and equal to the predetermined acceleration reference value $A_{REF}$, the management means 200 determine a rotational speed reference $V_{CONS}$ for the shaft 140 and send this to the circuit for controlling the starter 180, thereby allowing this difference to be corrected. Such a reference aims to allow the acceleration of the shaft 140 to be regulated by the starter, that is to say that said acceleration converges, at the earliest, for example from the following time interval [t2, t3], towards the predetermined reference value $A_{REF}$.

Therefore, with reference to FIG. 4, the speed reference $V_{CONS}$ sent to the starter 180 by the management means 200 indicates a reduction in the rotational speed of the shaft 140 such that the acceleration of the shaft over the time interval [t2, t3] is less than the reference acceleration $A_{REF}$ such that it converges towards said reference value $A_{REF}$, the shaft thus reaching the speed n3 at the time t3.

The management means 200 send the speed reference $V_{CONS}$ to the circuit for controlling the starter 180, for example at the time t2 or slightly thereafter, such that the starter 180, via its control circuit, rapidly adapts the torque provided to the shaft 140 and therefore the rotational speed of the shaft 140 from the received speed reference $V_{CONS}$.

The method according to the invention therefore allows the acceleration value of the compressor shaft 140 to be made to converge towards a reference value $A_{REF}$ when they are significantly different, in particular over the duration of the first start-up phase P1.

When a predetermined threshold for the rotational speed of the shaft 140 is reached, for example within the ignition window, the second start-up phase P2 begins. A stabilisation step E2 allows the rotational speed of the shaft 140 to be stabilised within the ignition window over a duration that is long enough to allow fuel to be injected into the combustion chamber 120 and to allow said fuel to be completely ignited. Preferably, this stabilisation step E2 is carried out by setting the reference acceleration value $A_{REF}$ to zero such that speed is constant and is kept for example between 10% and 15% of the nominal speed of the turboshaft engine.

The method according to the invention may also comprise a step E3 of detecting the ignition of the fuel, during which step the temperature of the flow of gas output from the turboshaft engine is measured and said measurement is compared with a reference temperature value indicating the ignition of the combustion chamber.

Once the ignition is detected, a latency step E4, for example for 0.5 seconds, allows it to be ensured that the ignition has taken place correctly and in a sustainable manner, before a third start-up phase of the turboshaft engine begins during which the rotational speed of the shaft 140 increases.

Therefore, in a step E5 of accelerating the shaft 140, the compressor wheel 160 is accelerated, for example up to its maximum speed, during the start-up phase P3, such that the turboshaft engine can reach an aircraft flight mode.

Preferably, this step E5 includes continuous stabilisation of the torque provided by the starter to the compressor shaft during the third phase P3. In a manner similar to that in step E2, the management means 200 allow the torque to be regulated by sending torque references $C_{CONS}$ to the starter.

The resistive torque of the turboshaft engine depends on several factors, in particular on the rotational speed of the shaft and on the thermal behaviour of the turboshaft engine. However, since the difference between the torque provided by the starter and the resistive torque of turboshaft engine is proportional to the acceleration of the shaft, the acceleration varies depending on the resistive torque of the turboshaft engine, at a constant turboshaft-engine reference torque $C_{CONS}$.

Such continuous control of the torque provided to the compressor shaft 140 by the starter 180 allows the starter 180 to be prevented from providing, during this phase, too high a torque, which would risk leading to the combustion chamber of the turboshaft engine 100 being extinguished, as explained above.

Finally, the starter 180 can be stopped during the third phase P3, for example at the start thereof.

Therefore, the method and the system according to the invention allow the rotational speed of the shaft to be continuously controlled, in particular during the first start-up phase, such that the acceleration of the shaft remains substantially constant whatever the environmental conditions of the turboshaft engine (low temperature, low pressure, etc.).

The invention claimed is:

1. Method for starting an aircraft turboshaft engine, said turboshaft engine comprising a combustion chamber, a compressor shaft on which a compressor wheel is mounted to feed compressed air to said combustion chamber, at least one starter connected to said compressor shaft so as to provide the compressor shaft with a specified starting torque for driving the compressor shaft in rotation,
said method comprising: accelerating the compressor shaft during a first start-up phase (P1); then stabilising the rotational speed of the compressor shaft during a second start-up phase (P2) so as to allow fuel to be injected into the combustion chamber and to allow the fuel to be ignited, the rotational speed of the compressor shaft being regulated during acceleration of the compressor shaft during the first start-up phase (P1) and rotational speed of the compressor shaft being stabilised during the second start-up phase (P2) such that the acceleration of the compressor shaft remains substantially constant,
wherein said accelerating the compressor shaft during a first start-up phase (P1) includes obtaining an acceleration value over an interval of time; calculating the difference between the obtained acceleration value and a reference acceleration value; comparing the calculated difference with a predetermined acceleration threshold; and determining a speed reference or torque reference from the calculated difference if said acceleration threshold is exceeded.

2. Method according to claim 1, wherein during the stabilisation of the rotational speed of the compressor shaft during the second start-up phase (P2), the rotational speed of the compressor shaft is kept between 10% and 15% of a nominal rotational speed of the shaft.

3. Method according to claim 1, further comprising detecting ignition is carried out when the temperature of the gases output from the turboshaft engine exceeds a predetermined threshold.

4. Method according to claim 1, further comprising, after ignition of the fuel, accelerating the shaft, which allows the compressor wheel to be accelerated, said acceleration being regulated by the torque reference.

5. Method according to claim 1, wherein the rotational speed is regulated periodically.

6. Method according to claim 1, wherein said obtaining an acceleration value over an interval of time is carried out from two consecutive measurements of the rotational speed of the compressor shaft.

7. System for implementing a method for starting up an aircraft turboshaft engine,
said system comprising a turboshaft engine and a turboshaft engine management computer,
the turboshaft engine comprising a combustion chamber, a compressor shaft on which a compressor wheel is mounted to feed compressed air to said combustion chamber, at least one starter connected to said compressor shaft so as to provide the compressor shaft with a specified starting torque for driving the compressor shaft in rotation,
said starter configured to accelerate the compressor shaft during a first start-up phase in response to information received from the engine management computer, wherein said engine management computer is configured to accelerate the compressor shaft during a first start-up phase including obtaining an acceleration value over an interval of time; calculate the difference between the obtained acceleration value and a reference acceleration value; compare the calculated difference with a predetermined acceleration threshold; and determine a speed reference or torque reference from the calculated difference if said acceleration threshold is exceeded, and
and said starter is configured to stabilise the rotational speed of the compressor shaft during a second start-up phase in response to information received from the engine management computer, so as to allow fuel to be injected into the combustion chamber and to allow the fuel to be ignited, the engine management computer being configured to regulate the rotational speed of the compressor shaft such that the acceleration of the compressor shaft remains substantially constant.

8. System according to claim 7, wherein the starter is electric and comprises an electronic circuit for controlling the torque provided to the shaft.

9. Aircraft comprising: a turboshaft engine; and a system comprising a turboshaft engine management computer,
wherein the turboshaft engine comprises: a combustion chamber; a compressor shaft on which a compressor wheel is mounted to feed compressed air to said combustion chamber; and at least one starter connected to said compressor shaft so as to provide the compressor shaft with a specified starting torque for driving the compressor shaft in rotation,
said starter configured to accelerate the compressor shaft during a first start-up phase (P1), and configured to stabilise the rotational speed of the compressor shaft during a second start-up phase (P2), so as to allow fuel to be injected into the combustion chamber and to allow the fuel to be ignited, wherein the turboshaft engine and said turboshaft engine management computer are configured to: accelerate the compressor shaft during the first start-up phase (P1), wherein acceleration of the compressor shaft includes obtaining an acceleration value over an interval of time; calculating the difference between the obtained acceleration value and a reference acceleration value; comparing the calculated difference with a predetermined acceleration threshold; and determining a speed reference or torque reference from the calculated difference if said acceleration threshold is exceeded,
said starter is configured to then stabilise the rotational speed of the compressor shaft during a second start-up phase (P2) so as to allow fuel to be injected into the combustion chamber and to allow the fuel to be ignited,
the rotational speed of the compressor shaft being regulated during acceleration of the compressor shaft during the first start-up phase (P1) and the rotational speed of the compressor shaft being stabilised during the second start-up phase (P2) such that the acceleration of the shaft remains substantially constant.

10. Aircraft comprising; a turboshaft engine; and a system comprising a turboshaft engine management computer,
wherein the turboshaft engine comprises: a combustion chamber; a compressor shaft on which a compressor wheel is mounted to feed compressed air to said combustion chamber; and at least one starter connected to said compressor shaft so as to provide the compressor shaft with a specified starting torque for driving the compressor shaft in rotation,
wherein the turboshaft engine and said turboshaft engine management computer are configured to: accelerate the compressor shaft during a first start-up phase (P1), wherein acceleration of the compressor shaft includes obtaining an acceleration value over an interval of time; calculating the difference between the obtained acceleration value and a reference acceleration value; comparing the calculated difference with a predetermined acceleration threshold; and determining a speed reference or torque reference from the calculated difference if said acceleration threshold is exceeded,
the turboshaft engine and said turboshaft engine management computer configured to then stabilise the rotational speed of the compressor shaft during a second start-up phase (P2) so as to allow fuel to be injected into the combustion chamber and to allow the fuel to be ignited,
the rotational speed of the compressor shaft being regulated during acceleration of the compressor shaft during the first start-up phase (P1) and the rotational speed of the compressor shaft being stabilised during the second start-up phase (P2) such that the acceleration of the shaft remains substantially constant.

* * * * *

UNITED STATES PATENT AND TRADEMARK OFFICE
CERTIFICATE OF CORRECTION

Page 1 of 1

PATENT NO.         : 9,874,149 B2
APPLICATION NO.    : 14/426310
DATED              : January 23, 2018
INVENTOR(S)        : P. Harriet et al.

It is certified that error appears in the above-identified patent and that said Letters Patent is hereby corrected as shown below:

In the Claims

| Column | Line | Error |
|---|---|---|
| 9 (Claim 7, | 34-35 Lines 24-25) | "and said starter" should read --said starter-- |

Signed and Sealed this
Fifth Day of June, 2018

Andrei Iancu
*Director of the United States Patent and Trademark Office*